United States Patent [19]

Bram

[11] 4,033,613

[45] July 5, 1977

[54] LOCKED JOINT BETWEEN TWO PIPE ELEMENTS CAPABLE OF HAVING AN ANGULAR DEVIATION WITH RESPECT TO EACH OTHER

[75] Inventor: Georges Eugene Bram, Pont-a-Mousson, France

[73] Assignee: Pont-A-Mousson S.A., Nancy, France

[22] Filed: June 19, 1975

[21] Appl. No.: 588,457

[30] Foreign Application Priority Data

July 5, 1974 France .............................. 74.23526

[52] U.S. Cl. .............................. 285/184; 285/376; 285/421; 285/DIG. 16
[51] Int. Cl.² ............................................ F16L 21/00
[58] Field of Search .......... 285/376, 337, 231, 230, 285/403, 404, 184, 421, DIG. 16

[56] References Cited

UNITED STATES PATENTS

| 2,258,135 | 10/1941 | Curtis | 285/403 X |
|---|---|---|---|
| 2,935,342 | 5/1960 | Seamark | 285/376 X |
| 3,159,414 | 12/1964 | Widman | 285/403 X |
| 3,219,364 | 11/1965 | Wooldridge | 285/376 X |
| 3,480,300 | 11/1969 | Jeffery et al. | 285/376 X |
| 3,598,430 | 8/1971 | Maher | 285/376 X |
| 3,684,320 | 8/1972 | Platzer et al. | 285/403 X |
| 3,698,744 | 10/1972 | Bevington | 285/376 X |
| 3,765,706 | 10/1973 | Bram | 285/376 X |
| 3,844,589 | 10/1974 | Bram | 285/231 X |
| 3,869,156 | 3/1975 | O'Brien et al. | 285/403 X |

FOREIGN PATENTS OR APPLICATIONS 1,029,632 5/1958 Germany .......................... 285/376

*Primary Examiner*—Thomas F. Callaghan
*Attorney, Agent, or Firm*—Sughrue, Rothwell, Mion, Zinn and Macpeak

[57] ABSTRACT

The socket of one of the pipe elements has on at least a part of its outer end a radial abutment defining an abutment face facing inwardly of the socket. A device for locking the joint against forces tending to separate the pipe elements comprises at least one locking member having the general shape of a sector of a cylindrical ring and defining an inner wall which is secured to the smooth end portion of the other pipe element. At least one projecting portion is provided on the locking member and bears axially against the abutment face.

10 Claims, 6 Drawing Figures

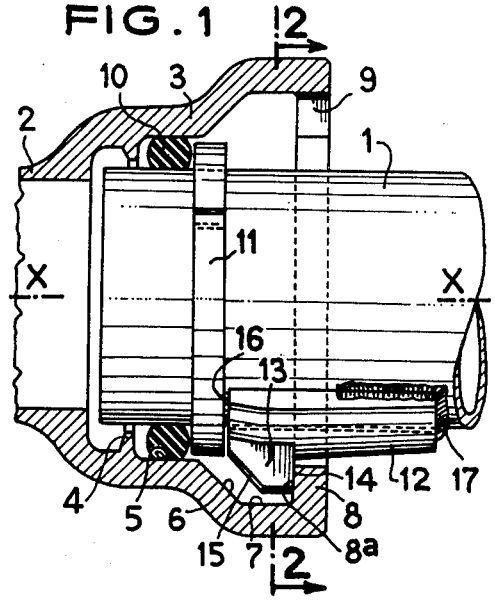
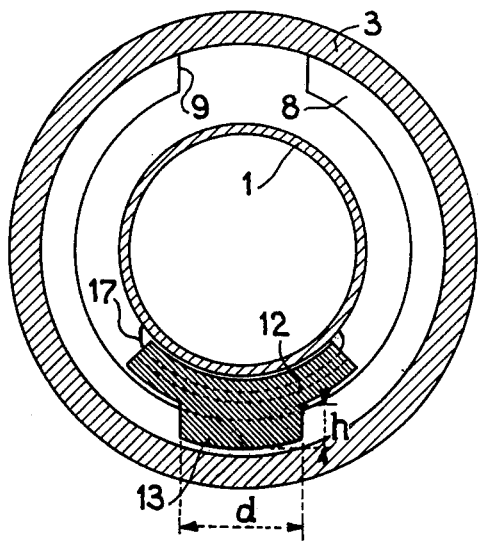
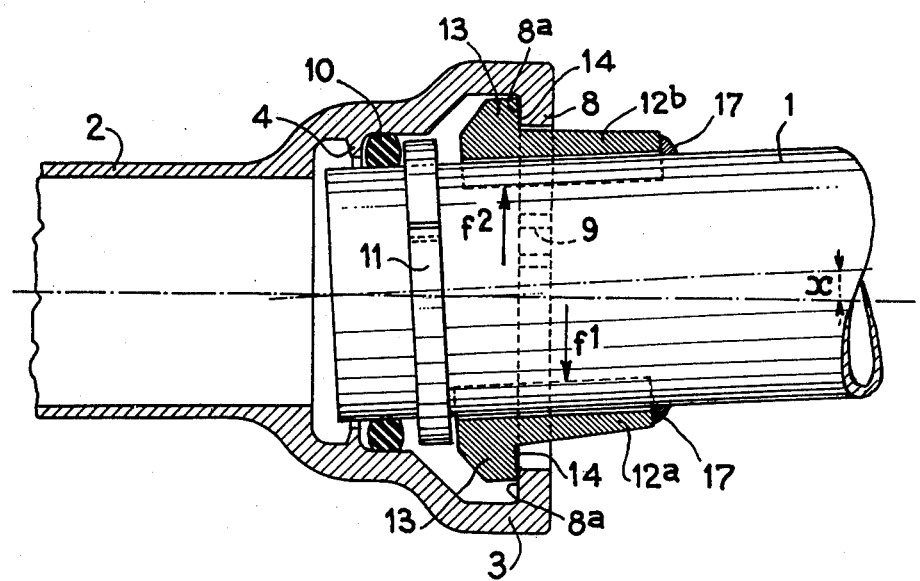

LOCKED JOINT BETWEEN TWO PIPE ELEMENTS CAPABLE OF HAVING AN ANGULAR DEVIATION WITH RESPECT TO EACH OTHER

The present invention relates to locked joints between two pipe elements capable of having an angular deviation with respect to each other. Such joints are adapted to prevent the separation of the two elements under the effect of an axial thrust exerted by the fluid in the pipe. More particularly, the invention relates to locked joints of the type comprising, on one hand, a smooth tubular end portion engaged in a socket which has a cavity for an annular sealing element and a free end which has on at least a part of its periphery a radial abutment wall and, on the other hand, a device for locking the joint against forces tending to separate the pipe elements.

It is known that in the vicinity of the elbows or branch connections of a pipe the fluid in the pipe exerts a certain axial thrust on the pipe elements. When the pipe is of very large diameter, the exterior friction between the pipe elements and the surrounding ground is insufficient to balance this thrust and the consecutive elements are liable to separate from each other. If it is desired in this case to avoid the use of concrete blocks which may be of considerable size, it is known to provide the joint with tensile force-resisting locking devices. As the trenches for the pipe are not perfectly rectilinear, these devices must allow a certain limited angular deviation between the considered elements when laying the pipe.

Known locking devices which satisfy this condition, for example that disclosed in the German Pat. No. D T 858,049, are expensive and not easy to employ and moreover they do not take into account the fact that the resistance to tensile force required of the joints and the peripheral position of the points of application of the locking forces depend on the position and orientation of the joint in the pipe. Consequently, the known locking devices are almost always excessively resistant and consequently of an excessively high price.

An object of the invention is to overcome this drawback and to provide a cheap locked joint which is easy to assemble and allows ensuring at each point of the pipe a resistance to tensile force merely sufficient to balance the maximum thrust anticipated at this point during the use of the pipe.

According to the invention there is provided a locked joint between two pipe elements of the aforementioned type wherein the locking device comprises at least one locking member which has the general shape of a sector of a cylindrical ring whose inner wall is fixed to the smooth tubular end portion and one or more radial projecting portions which bear against the face of said abutment wall which faces the inner end of the socket.

Preferably, the abutment wall is constructed in the form of a flange which extends radially inwardly and in which are formed one or more notches permitting the passage of said projecting portions or portions.

Further features and advantages of the invention will be apparent from the ensuing description given solely by way of a non-limitative example with reference to the accompanying drawings in which:

FIG. 1 is a partial diametral sectional view of a locked joint according to the invention applied to two coaxial pipe elements;

FIG. 2 is a sectional view taken on line 2—2 of FIG. 1;

FIG. 3 is a view similar to FIG. 1 showing a modification of this joint applied to two pipe elements which have an angular deviation with respect to each other;

Figure 4:
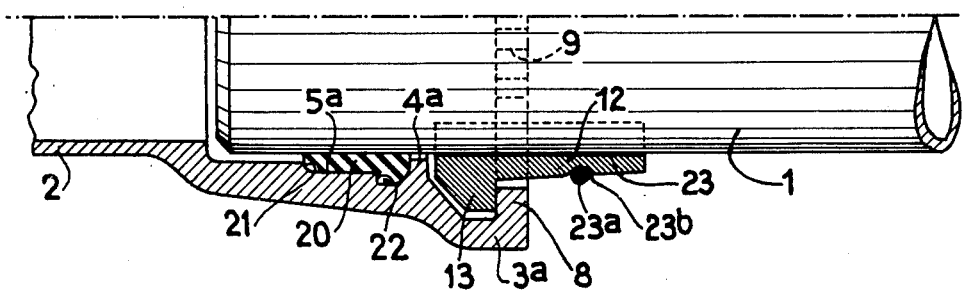
FIG. 4 is a half diametral sectional view of a modification of the joint shown in FIG. 1.

The joint shown in FIGS. 1 and 2 interconnect two cast iron pipe elements 1 and 2 which are roughly coaxial with respect to an axis X—X. The element 1 constitutes a smooth cylindrical end portion or male end which is introduced into a socket 3 which terminates the second element 2 with which it is moulded in one piece. A radial flange 4 provided in the inner end of the socket 3 ensures a rough guiding of the end portion of the element 1 in the socket. The socket 3 comprises, starting at the flange 4, a cylindrical cavity 5, a divergent frustoconical portion 6 and a second cylindrical portion 7 having a diameter exceeding the diameter of the cylindrical cavity 5.

The cylindrical portion 7 is axially defined by a radial flange 8 which terminates the socket 3. A notch 9 having a roughly square cross-sectional shape is formed in the flange 8 in the plane of FIG. 1.

An annular sealing element 10 is disposed adjacent the end of the smooth end portion of element 1 and is radially compressed in the cavity 5 between the wall of the latter and the wall of the element 1. A split ring 11 is also disposed on the end portion of the element 1 and its outside diameter is slightly less than the inside diameter of the cavity 5. This split ring 11 prevents any danger of expulsion of the sealing element 10 out of the socket in use under the effect of the pressure of the fluid in the pipe.

A cast iron locking member or sector 12 completes the joint just described. This sector 12 has an inner wall in the shape of a cylindrical sector matching the exterior face of the element 1. One axial end of the sector 12 is provided with a radial projecting portion 13 which has a planar radial face 14 facing out of the socket 3 and on the other side an inclined face 15 defining a chamfer and allowing the whole of the projecting portion 13 to be disposed in the part 5-6 of the socket. The face 15 is connected to an end radial face 16 of the sector 12. The projecting portion 13 has a roughly square-shaped cross section whose width $d$ and height $h$ allow it to pass through the notch 9. The projecting portion 13 bears by its radial bearing face 14 against the face $8^a$ of the flange 8 which faces the inner end of the socket 3. Between this projecting portion 13 and the end of the sector 12 outside the socket the thickness of this sector decreases so that the outer wall of the sector 12 is approximately frustoconical and has a small angle of inclination. The part of the sector 12 which is outside the socket 3 is secured to the outer face of the tubular end portion of the element 1 by a weld bead 17.

Such a locked joint is assembled in the following manner:

After having introduced the smooth end portion of the element 1 into the end of the socket 3, the end portion of the element 1 being guided by the flange 4 of the socket 3, the sealing element 10 is urged into its cavity 5 by means of any suitable tool. This sealing element is then compressed radially between the inner wall of the cavity 5 and the outer wall of the end portion of the element 1. The split ring 11 (which was already mounted on the element 1 in the same way as the sealing element 10) is then urged along the pipe element until it reaches a position in the vicinity of the entrance of the cylindrical cavity 5.

The joint has now to be locked. For this purpose, the sector 12 is disposed on the pipe element 1 and the projecting portion 13 of the sector 12 is passed through the notch 9. The inner face of the sector 12 remains constantly in bearing relation to the outer surface of the pipe element 1 and the whole of the sector 12 is turned until its desired angular position is reached before putting the radial face 14 of the projecting portion 13 into bearing relation with the inner face $8^a$ of the flange 8. The part of the sector 12 outside the socket 3 is now secured to the pipe element 1 by the weld bead 17.

In the joint shown in FIGS. 1 and 2, it has been assumed, in order to clarify the description, that the two pipe elements to be interconnected were coaxial and that only a single locking sector 12 was employed. However, this type of joint has its most advantageous application in the case shown in FIG. 3 in which the two pipe elements 1 and 2 have a certain angular deviation $x$. In order to render the drawing more clear, the angle $x$, which is in practice very small, has been exaggerated and the plane of the section shown in FIG. 3 corresponds to a diametral plane different to that of FIG. 1 as will be understood by a comparison of the respective positions of the notch 9 of the flange 8 in these two Figures. The plane of the section shown in FIG. 3 is the plane defined by the two axes of the elements 1 and 2.

The joint shown in FIG. 3 is locked by means of two sectors $12^a$ and $12^b$. The sector $12^a$ after having been partly introduced in the socket 3 through the notch 9, has been turned round the pipe element 1 in the direction $f^1$ until its desired position has been reached. The other sector $12^b$, also after having been introduced partly through the same notch 9 has been turned in the other direction $f^2$ round the pipe element 1 until its desired position has been reached, which is, in the illustrated embodiment, roughly diametrally opposed to that of the sector $12^a$. Thereafter, as before, the radial faces 14 of the projecting portions 13 of the sector $12^a$ and $12^b$ are put into bearing relation with the inner face $8^a$ of the flange 8 and the two sectors are secured to the pipe element 1 by a weld bead 17. The welded end portions of the sectors $12^a$ and $12^b$ do not pertain to the same transverse plane of the pipe 1 but are offset a distance therefrom which depends on the angle $x$ and on the diameter D of the pipe. If $D = 2$ m and $x = 3°$, this distance corresponds to D tan $x$ 20 cm. This shows the interset of the discontinuous locking sectors.

It will be observed that the end radial face 16 of the sector 12 facing the inner end of the socket 3 provides additional safety against expulsion of the sealing element 10 from the cavity 5 under the effect of the pressure exerted by the fluid in the pipe. Although the split ring 11 is itself held tightly against the end portion of the pipe element 1 under the effect of its own elasticity any possible movement of this split ring 11 outwardly of the socket 3 is limited by the abutment of this ring 11 against the face 16 of the locking sector or sectors 12.

FIG. 4 is a half-sectional view of a locked joint constituting a modification of the joint shown in FIGS. 1 and 2. According to this modification, the sealing element 20 is disposed in a cavity $5^a$ of the socket $3^a$ which is provided with two radial shoulders 21 and 22 which limit the displacement of the sealing element 20 toward the inner end of the socket, the outer end of the cavity $5^a$ being axially defined by the flange $4^a$ for guiding the end portion of the pipe element 1 when assembling the joint. This assembly is carried out by first placing the sealing element 20 in its cavity $5^a$ and then introducing the smooth end portion of the element 1 in the socket $3^a$.

The end of the socket $3^a$ is shaped in the same way as that of the socket 3 shown in FIGS. 1 and 2 and the joint is locked in the same way by means of the same sector 12 except that the sector or sectors 12 are fixed to the smooth end portion of the element 1 by adhesion by means of an adhesive layer 23. The sector or sectors 12 can be held in position during the adhesion by a cable $23^a$ which is disposed in a groove $23^b$. By way of a modification, the sector or sectors 12 may be held in position by welding as shown in FIG. 1.

Figure 5:
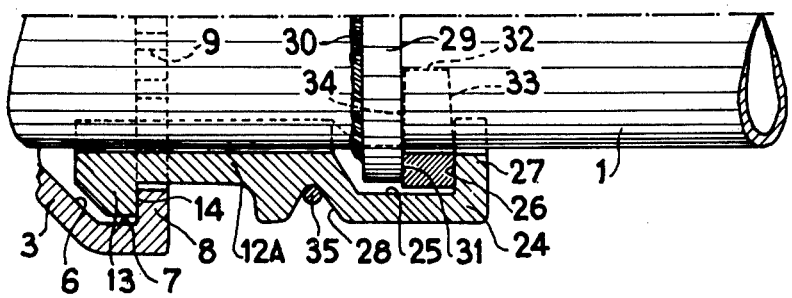
FIG. 5 is a partial half sectional view similar to FIG. 4 of another embodiment of the locked joint according to the invention.

The embodiment shown in FIG. 5 may be applied for example to the socket 3 of the joint shown in FIG. 1. According to this embodiment, each sector 12A is provided on its end outside the socket 3 with a portion of greater thickness 24 having an internal recess 25. The latter is axially defined by a radial wall 26 of an end flange 27 of the sector 12A. A peripheral groove 28 is formed in the outer wall of the reinforced part 24 of each sector 12A. A square-section ring 29 is previously secured in the factory to at least a part of the periphery of the pipe element 1 by a weld bead 30 effected on the side of the ring 29 adjacent the end of the pipe element 1. The ring 29 has a planar radial wall 31 on the side of the ring 29 opposed to the weld bead 30.

After having disposed a sector 12A in the desired place on the pipe element 1, the radial face 14 of the projecting portion 13 of this sector being in bearing relation with the inner face of the flange 8 of the socket 3, the abutment ring 29 is located in the region of the recess 25 of the sector 12A. In order to lock the joint, a curvilinear wedge 32 whose oblique edges 33 and 34 are parallel in cross section and respectively bear against the confronting faces 26 and 31, is forced in. When each sector 12 has been thus locked in position in the axial direction, a permanent cooperation between the inner face of the sector 12 with the outer face of the pipe element 1 is ensured by uniting all the sectors 12 by means of a cable 35 disposed in the groove 28 of each sector.

Figure 6:
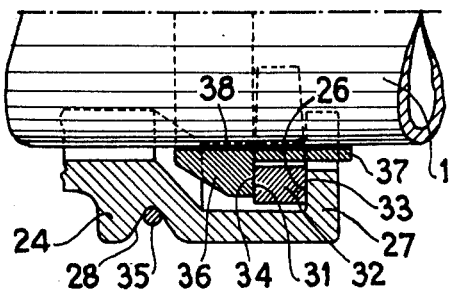
FIG. 6 shows a detail of a modification of the joint shown in FIG. 5.

FIG. 6 shows a modification of this joint in which the radial abutment face 31 opposed to the radial face 26 of the flange 27 pertains to a radial projecting portion 36 to a thin sleeve 37 which is adhered in the factory, prior to the assembly of the joint, to the pipe element by means of a film of adhesive 38. Another modification of the joint shown in FIG. 5 consists in providing an abutment ring, such as the ring 29, which is welded in one piece with the end portion of the element 1.

It will be understood that the joints shown in FIGS. 5 and 6 have the advantage of not requiring relatively complicated operations on the site, such as welding or adhesion. These joints merely require a set of wedges or blocks 32 whose axial dimensions, that is to say the dimensions between their radial faces 33 and 34, permit satisfying all the anticipated configurations as to the diameter of the pipe and the angular deviations between the pipe elements. By way of an accessory a locking screw (not shown) may be provided to hold the wedges fast in their final position.

Note that in the various considered joints there may be provided a plurality of notches 9 in the flange 8 in order to facilitate the introduction of the sectors 12. Also, by way of a modification, each sector may be provided with a plurality of projecting portions 13.

The sectors 12 are subjected to shear stress in the region of the base of their projecting portion 13. This explains the fact that it is sufficient that the projecting portion 13 bear on the flange 8 on the width of the projecting portion 13 so that the sector 12 can employ all its tensile strength. If $l$ is the axial distance between the radial faces 14 and 15 of the projecting portion 13 of a sector 12, this length $l$ also being the axial length of the projecting portion 13 at its base, the locking force ensured by this sector 12 is a function of the product of $l$ multiplied by the width $d$ of the projecting portion 13 of this sector. Indeed, this product represents the wrenching area on which the shearing force is exerted. Consequently, for a given material of the sector 12, and for given conditions of utilisation of the pipe, it is easy to determine the number of sectors 12 to employ for efficiently locking the joint and the angular positions to give to these sectors. The use of a locked joint according to the invention is therefore extremely flexible and permits adapting it to any practical case encountered by giving the locking device merely the tensile resistance necessary in this case at adequate points of application of the locking forces. There is therefore a considerable saving in material which, when the pipe elements are of very large diameter, represents a very important reduction in manufacturing costs.

Moreover, such locked joints are constituted by merely massive as-cast parts requiring no machining of the parts employed nor any fixing device, such as screws or metal hooks, which would be liable to corrode.

Another important advantage of the invention resides in the fact that the locking is effected purely under conditions of tensile force in the vicinity of the generatrix of the smooth end portion of the pipe element 1. This permits having only parts which operate only in a straight line with no radial reaction. In this way, there is no tendency to radially crush the locking parts and split the socket.

Further, it will be observed that the axial deviation between the pipe elements in no way alters the quality of the sealing of the joint which is completely independent of the locking thereof.

Having now described my invention what I claim as new and desire to secure by Letters Patent:

1. A locking device for locking a joint between two pipe elements against forces tending to separate the pipe elements, in which joint one pipe element is capable of having its axis angularly deviating from a coaxial position with respect to the other pipe element, there being provided a smooth tubular end portion on a first of the pipe elements and a socket on a second of the pipe elements, the socket having a cavity for an annular sealing element and a free outer end which has on the periphery of the outer end a radial abutment wall defining a first abutment face extending radially inwardly and facing axially inwardly of the socket, the locking device comprising in combination a notch defined by the abutment wall, at least one locking member which is separate from the pipe elements before locking the joint and initially unfixed therefrom and has the general shape of a sector of a cylindrical ring and is capable of passing axially through said notch subsequent to the engagement of the smooth end portion in the socket and defines a radially inner wall for placing adjacent the tubular end portion and has a radially outer projecting portion defining a second abutment face extending radially outwardly for abutment against said first abutment face, said second abutment face facing axially outwardly of the socket in the assembled state of the joint, whereby the locking member has an engagement with the abutment wall which allows the locking member freedom of angular movement relative to the axis of the second pipe element when assembling the two pipe elements, the locking member having an elongated extension portion which extends from said abutment face outside the socket in a direction parallel to the axis of the first pipe element between the abutment wall and the tubular end portion with sufficient radial clearance between the abutment wall and the extension portion to allow the first pipe element to be assembled with the second pipe element with said angular deviation, the locking member having a circumferential extent allowing the utilization of a plurality of said locking members between the socket and the tubular end portion by insertion thereof in succession by way of the notch subsequent to the engagement of the smooth end portion in the socket, and means independent of the socket for axially locking the extension portion with the first pipe element for precluding movement of the locking member, axially relative to the first pipe element toward the end of the first pipe element in the socket, subsequent to the positioning of the projecting portion of the locking member axially against said abutment face.

2. A device as claimed in claim 1, wherein the abutment wall is contained in a plane perpendicular to the axis of the second pipe.

3. A device as claimed in claim 1, wherein said face of the abutment wall is contained in a plane perpendicular to the axis of the second pipe.

4. A device as claimed in claim 1, wherein the abutment wall is in the form of an annular flange in which there are formed at least one notch permitting the passage of said projecting portion of the locking member.

5. A device as claimed in claim 1, wherein the locking member has an elongated extension portion extending outside the socket, said means for axially locking the extension portion with the first pipe element for precluding movement of the locking member comprising a weld bead disposed along and connecting at least a part of an edge of said extension portion to the smooth tubular end portion in the locked state of the joint.

6. A device as claimed in claim 1, wherein said means for precluding movement of the locking member comprise an adhesive layer interposed between said inner wall and the smooth tubular end portion in the locked state of the joint.

7. A locking device for locking a joint between two pipe elements against forces tending to separate the pipe elements, in which joint one pipe element is capable of having its axis angularly deviating from a coaxial position with respect to the other pipe element, there being provided a smooth tubular end portion on a first of the pipe elements and a socket on a second of the pipe elements, the socket having a cavity for an annular sealing element and a free outer end which has on the periphery of the outer end a radial abutment wall defining an abutment face extending radially inwardly and facing axially inwardly of the socket, the locking device comprising a notch defined by the abutment wall, at least one locking member which is separate from the pipe elements before locking the joint and has the general shape of a sector of a cylinder ring and is capable of passing axially through said notch subsequent to the engagement of the smooth end portion in the socket and defines a radially inner wall for placing adjacent the tubular end portion and has a radially outer projecting portion for abutment against said abutment face, the locking member having an engagement with the abutment wall which allows the locking member freedom of angular movement relative to the axis of the second pipe element when assembling the two pipe elements and extending in a direction parallel to the axis of the first pipe element between the abutment wall and the tubular end portion with sufficient radial clearance between the abutment wall and the locking member to allow the first pipe element to be assembled with the second pipe element with said angular deviation, the locking member having a circumferential extent allowing the utilization of a plurality of said locking members between the socket and the tubular end portion by insertion thereof in succession by way of the notch subsequent to the engagement of the smooth end portion in the socket, and means independent of the socket and in contact with the locking member and with the first pipe element for precluding movement of the locking member, axially relative to the first pipe element toward the end of the first pipe element in the socket, subsequent to the positioning of the projecting portion of the locking member axially against said abutment face, said means for precluding movement comprising abutment means integral with the tubular end portion, a recess in the locking member which recess is defined by a radial wall at an end of the recess opposed to the inner end of the socket, and a wedge member interposed between and axially engaging the abutment means and the radial wall of the locking member whereby the radial wall of the locking member is axially supported by the abutment means through the wedge member.

8. A device as claimed in claim 7, wherein said abutment means is a ring having a square cross-sectional shape and a weld bead fixing the ring to the smooth tubular end portion 9. A device as claimed in claim 7, wherein said abutment means is a sleeve having a radial projecting portion and an adhesive layer interposed between the sleeve and the smooth tubular end portion and securing the sleeve to the smooth tubular end portion.

10. A device as claimed in claim 7, wherein said abutment means is in one piece with the smooth tubular end portion.

* * * * *